Patented Oct. 12, 1948

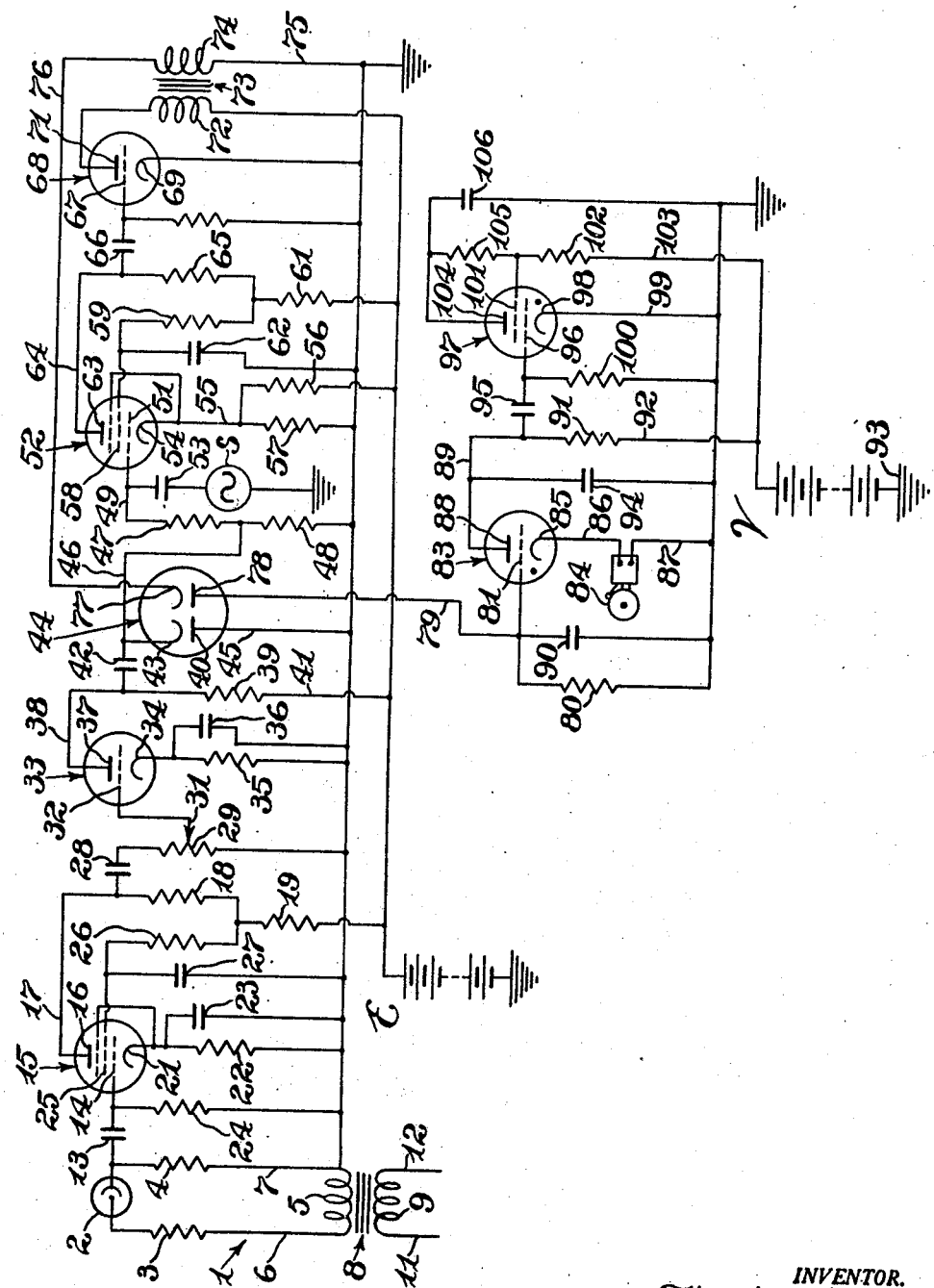

2,450,990

UNITED STATES PATENT OFFICE 2,450,990

SENSITIVE PHOTOELECTRIC CONTROL FOR SIGNAL DEVICES

Theodore K. Riggen, Elmira, N. Y.

Application June 4, 1947, Serial No. 752,511

4 Claims. (Cl. 177—311)

The present invention relates to a sensitive photo-electric control and more particularly to photo-electric means for actuating a signal when the intensity of illumination of the device falls below a pre-determined critical value.

Various forms of photo-electric devices for signalling changes in illumination have been heretofore produced, and found useful in detecting departures from uniformity in color of objects, and variations in translucence of liquids and gases, etc. While such devices as heretofore constructed have considerably greater discrimination than the human perceptions, there has existed a demand for instruments of greater sensitivity and uniformity of response than has been found possible with the conventional types of photo-electric circuits.

It is an object of the present invention to provide a novel photo-electric control of a signalling device which is extremely sensitive to small changes in illumination, while being simple in construction, stable in operation and readily adjustable in respect to the critical light value.

It is another object to provide such a device in which a photo-electric cell is used to control the bias on the grid of a sharp cut-off amplifier tube, and a signal amplified by said tube is used to control the operation of a signalling device.

It is another object to provide such a device which is readily adjustable so as to operate the amplifier tube close to its point of cut-off at all times, and thereby takes full advantage of the sensitivity of the tube to slight changes in grid bias while in that condition.

Further objects and advantages will be apparent from the following description taken in connection with the accompanying drawing in which the figure illustrates diagrammatically a preferred form of the present invention.

In the drawing there is illustrated a signal circuit indicated generally by numeral 1, comprising a photo-electric cell or tube 2, a resistor 3 connected to the cathode of the tube, a second resistor 4 connected to the anode of the tube and a source of alternating voltage 5 connected by the leads 6 and 7 to the resistors 3 and 4 respectively. As here shown the source of alternating voltage is in the form of the secondary of a transformer 8, the primary 9 of which is connected to any convenient source of alternating current such as the 110 volt power mains 11 and 12.

The photo cell 2 is arranged in any conventional manner to be illuminated by the light, the intensity of which is to be measured, and it will be understood that the photo cell is of that type, the conductivity of which varies in accordance with the intensity of illumination.

The anode of the photo cell is connected through a condenser 13 to the control grid 14 of an amplifier tube 15. Tube 15 is preferably of the pentode type, and the plate 16 thereof is connected by means of a lead 17 and resistors 18 and 19 to a suitable source of plate voltage indicated at E.

The cathode 21 of tube 15 is connected to the ground through a resistor 22 bridged by a condenser 23, and the grid 14 of the tube is also grounded through a resistor 24, resistors 22 and 24 being of such value as to maintain the grid 14 at a suitable negative bias with respect to the cathode 21. The screen grid 25 of the tube 15 is maintained at a suitable positive potential by connection to the power supply E through resistors 26 and 19, said screen grid being connected to the ground through a condenser 27.

The plate lead 17 of tube 15 is connected through a coupling condenser 28 to a potentiometer 29, the movable arm 31 of which is connected to the grid 32 of a second amplifying tube 33 thus forming a resistance coupling from tube 15 to tube 33 the gain of which is adjustable by the potentiometer 29.

Cathode 34 of tube 33 is connected to the ground through resistor 35 and condenser 36, and the plate 37 is connected by a lead 38 to a resistor 39 which is connected in turn by a lead 41 to the voltage supply E.

The plate lead 38 is connected through a coupling condenser 42 to one cathode 43 of a twin rectifier tube 44 such as the type commonly designated 6H6. The corresponding anode 40 of tube 44 is connected to the ground by a lead 45.

The coupling condenser 42 is also connected by a lead 46 to a voltage divider formed by resistors 47 and 48, the resistor 48 being grounded, and resistor 47 being connected by a lead 49 to the control grid 51 of a sharp cut-off amplifier tube 52 such as that known commercially as type 6SJ7. The control grid 51 is also connected through a condenser 53 to a signal generator S whereby a constant alternating voltage signal is impressed on said grid. The cathode 54 of tube 52 is maintained at a suitable positive voltage with respect to ground by means of a connection 55 to a voltage divider formed by resistors 56 and 57, resistor 56 being connected to the plate voltage supply E, and resistor 57 being grounded.

The screen grid 58 of tube 52 is connected to the plate voltage supply through resistors 59 and 61, and is connected to the ground through a condenser 62. The plate 63 of tube 52 is connected by a lead 64 to a resistor 65 which is also connected to the resistor 61 so as to connect the plate to the power supply E.

The plate lead 64 is connected by a coupling condenser 66 to the grid 67 of an amplifying tube 68, the cathode 69 of which is grounded, and the plate 71 of which is connected to the power supply E through the primary 72 to a transformer 73. One terminal of the secondary 74 of transformer 73 is connected to the ground as indicated at 75 and the opposite terminal is connected by a lead 76 to the second cathode 77 of the twin rectifier tube 44.

The corresponding plate 78 of rectifier 44 is connected by a lead 79 to the control grid 81 of a gaseous discharge tube or thyratron 83 such as the type known as 884. The thyratron 83 is used to actuate a signalling device or alarm here shown in the form of an electric bell 84, and for this purpose the cathode 85 of said tube is connected by the lead 86 to one terminal of the bell 84, the opposite terminal of which is grounded through a lead 87. The plate 88 of tube 83 is connected by a lead 89 to a resistor 91, and the resistor is connected by a lead 92 to the positive terminal of a source of voltage V, the negative terminal of which is grounded as indicated by 93. A storage condenser 94 is connected between the plate 88 of tube 83 and the ground whereby the condenser is charged by current traversing the resistor 91 when the tube 83 is non-conductive, and said condenser discharges through the tube 83 when it becomes conductive, thereby actuating the signalling device 84. In order to provide a visual signal as well as an audible signal, the plate lead 89 of tube 83 is connected through a condenser 95 to the inner grid 96 of a strobotron tube 97 such as that known as type 931-P1, said grid being connected to ground through a resistor 100. The cathode 98 of the strobotron is grounded as indicated at 99. Its outer grid 101 is connected to the power source V through a resistor 102 and lead 103, and its plate 104 is connected to the resistor 102 through a second resistor 105. The plate 104 is also connected to the ground through a condenser 106 whereby the strobotron will fire and produce a visible signal when the thyratron 83 discharges.

In the operation of the device the photo-electric cell 2 is located in position to be illuminated by the source of light to be measured, and is activated by an alternating voltage supply through the transformer 8. Assuming that light of a given intensity strikes the photo cell 2, a corresponding number of electrons will be released from the cathode of said tube, and current will accordingly pass from the transformer 8 through resistor 4, photo cell 2 and resistor 3 back to the transformer on that half of the oscillation wherein the anode of the photo cell is positive with respect to the cathode. This will develop a voltage across the resistor 4. During the other half of the oscillation wherein the anode of the photo cell is negative with respect to the cathode, there will be no current flow, and hence no voltage across the resistor 4. A signal will then have been developed across resistor 4 which will have the character of half of a sine wave. This signal also appears across the resistor 24, by virtue of the coupling condenser 13, which condenser moves the zero line of the signal from its normal position to a position half-way between the extremes, so that the signal appears across the resistor 24 and therefore between the grid 14 and cathode 21 of tube 15 as an alternating current signal with one end flat. This signal will then be amplified by the tube 15 and by means of the coupling condenser 28 will be expressed across the potentiometer 29. That portion of this signal existing between the arm 31 of the potentiometer and the ground will be expressed between the grid 32 of tube 33 and its cathode 34 whereby it will be amplified by the tube 33 and by means of the coupling condenser 42 will be expressed across the resistor 48. The signal across resistor 48 would therefore be an alternating current signal except for the rectifying action of the tube 44.

During that half of the signal expressed across resistor 48 wherein the cathode 43 of rectifier 44 is negative with respect to its plate 40, current will flow through the rectifier rather than through resistor 48 since in this direction the rectifier has a low impedance compared to said resistor. During the other half of the signal no current will flow through the rectifier 44 and hence the current will be forced to flow through resistor 48. Condenser 42 and resistor 48 therefore act as a filter for the pulsating current across resistor 48 so as to maintain a substantially constant direct current through said resistor so long as the illumination of the photo cell 2 remains constant.

The ungrounded end of resistor 48 is the positive end, and the voltage drop through the resistor is thus used by virtue of the connection through the resistor 47 to bias the grid 51 of amplifier tube 52 positive with respect to ground. The voltage dividers 56 and 57 maintain the cathods 54 of tube 52 positive with respect to ground, so that the amplification factor of tube 52 is a function of the difference between the biases on the cathode and on the grid of the tube. The signal introduced from the signal generator S through the condenser 53 across resistors 47 and 48 will be amplified by the tube 52 by an amount corresponding to the amplification factor of said tube as governed by the biases above set forth.

If now the intensity of the light striking the photo cell 2 should be reduced, the signal across resistor 4 will decrease, decreasing the signal across resistor 24 and thereby decreasing the positive bias of the grid 51 of amplifier tube 52. This causes said grid to appear more negative with respect to the cathode 54 of said tube and the gain of the tube will be reduced. The output of the second amplifier tube 68 will therefore be reduced. Reduction of the out-put of this tube, reduces the out-put of transformer 73 which reduces the rectified signal through the cathode and anode 77, 78 of tube 44 which is expressed across resistor 80 and condenser 90. This rectified out-put may be assumed, at the initial light intensity, to have held the grid 81 of the thyratron 83 at a substantially negative bias with respect to the cathode 85 which prevents the tube from becoming conductive. The lowered intensity of the light striking the photo cell 2 causes a reduction in this negative bias on the grid 81, and when said reduction is sufficient the tube will discharge.

Condenser 94 is normally charged from the power source V through the resistor 91. When the thyratron 83 becomes conductive, condenser 94 discharges through the tube and the signal device 84, thus operating the latter. The amount of current permitted to pass by the resistor 91 is insufficient to maintain the tube 83 conductive, therefore as soon as condenser 94 is discharged the tube 83 will heal and become non-conductive whereupon the condenser 94 will be recharged through resistor 91 until the critical voltage is reached whereupon it will again discharge through the tube 83, such discharges continuing as long as the bias of the grid 81 of tube 83 is sufficiently small with respect to the cathode 85 to permit the tube to fire.

With each discharge of condenser 94, through the signalling device 84 and tube 83, the resistance through the tube 83 will approach zero and the current through resistor 91 will increase. The voltage drop across resistor 91 will therefore be increased and this voltage, through condenser 95 will be expressed across resistor 100 and on the grid 96 of tube 97. This voltage will initiate break-down in the tube and cause it to fire.

If the light intensity at the photo cell continues to decrease or remains at that level, the signalling device will continue to operate. When the light intensity increases above the critical point, the bias on the grid 81 will again block the thyratron 83 and the signalling device will cease to operate.

Although but one form of the invention has been shown and described in detail it will be understood that other embodiments are possible and that various changes may be made in the design and arrangement of the parts without departing from the scope of the invention.

What is claimed is:

1. In a photo-metric device a signal generating circuit including a source of alternating current, a resistor and a photo-sensitive electronic tube, means for amplifying and rectifying the signal produced by said circuit so as to produce a positive voltage which varies in accordance with the intensity of illumination of said photo-sensitive tube; a second amplifying and rectifying means including an amplifying tube having a cathode, an anode and a control grid; means for impressing a substantially constant alternating signal voltage on said grid, means for biasing the grid negatively with respect to the cathode to render the tube non-conductive, means for filtering the amplified and rectified signal from the signal circuit and impressing it on said grid of the amplifying tube so as to render the amplifying tube conductive when the photo-sensitive tube receives light of a pre-determined intensity, a signalling device, and means responsive to a reduction in out-put of the second amplifying means for causing actuation of said signalling device.

2. A photo-metric device as set forth in claim 1 including means for adjusting the gain of the first mentioned signal amplifying means so as to cause a pre-determined illumination of the photo-sensitive tube to render said amplifying tube conductive.

3. A photo-metric device as set forth in claim 1 in which the signalling device includes a thyratron, an alarm device actuated by the discharge thereof and means actuated by the out-put of said second amplifying means for preventing discharge of the thyratron.

4. A photo-metric device as set forth in claim 1 in which said signalling means includes a thyratron having a control grid, an alarm actuated by the discharge of the thyratron, means for rectifying the out-put of said amplifier to produce a negative voltage therefrom and means for impressing said negative voltage on the grid of the thyratron to prevent discharge therefrom until said out-put falls below a pre-determined value.

THEODORE K. RIGGEN.

REFERENCES CITED

The following references are of record in the file of this patent:

UNITED STATES PATENTS

| Number | Name | Date |
|---|---|---|
| 2,084,186 | Braden | June 15, 1937 |
| 2,122,850 | Thompson | July 5, 1938 |
| 2,234,011 | Shepard | Mar. 4, 1941 |
| 2,284,289 | Lindsay | May 26, 1942 |
| 2,372,062 | Dorsman | Mar. 20, 1945 |
| 2,391,532 | Wilmotte | Dec. 25, 1945 |
| 2,415,175 | Hurley | Feb. 4, 1947 |